(12) United States Patent (10) Patent No.: US 7,647,361 B2
Thornton et al. (45) Date of Patent: Jan. 12, 2010

(54) AUTOMATICALLY MAINTAINING METADATA IN A FILE BACKUP SYSTEM

(75) Inventors: John M. Thornton, Kirkland, WA (US); David R. Parlin, Redmond, WA (US); Eric J. Wright, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/475,763

(22) Filed: Jun. 27, 2006

(65) Prior Publication Data

US 2007/0299888 A1 Dec. 27, 2007

(51) Int. Cl.
*G06F 12/00* (2006.01)
(52) U.S. Cl. .................................... 707/202; 707/204
(58) Field of Classification Search .......... 707/200–206
See application file for complete search history.

(56) References Cited

U.S. PATENT DOCUMENTS

| 2002/0055942 | A1* | 5/2002 | Reynolds ................... 707/200 |
| 2002/0099959 | A1* | 7/2002 | Redlich et al. .............. 713/201 |
| 2004/0107225 | A1* | 6/2004 | Rudoff ....................... 707/204 |
| 2005/0004979 | A1* | 1/2005 | Berkowitz et al. .......... 709/203 |
| 2005/0091270 | A1* | 4/2005 | Beilinson et al. ......... 707/103 Y |
| 2006/0078224 | A1* | 4/2006 | Hirosawa .................... 382/284 |
| 2006/0155788 | A1* | 7/2006 | Peterson et al. ............. 707/204 |
| 2006/0206547 | A1* | 9/2006 | Kulkarni et al. ............. 707/205 |

* cited by examiner

*Primary Examiner*—Wilson Lee

(57) ABSTRACT

A technology for automatically saving an original copy of an image file in a location hidden from a user is disclosed. The technology accesses metadata associated with an image file and determines whether an original copy of the image file exists. Provided an original copy of the image file exists, an edited version of the image file along with an identifier is saved. If an original copy of the image file does not exist, an original copy of the image file is created, the original copy of the image file is stored, and an edited version of the image file along with an identifier is saved.

14 Claims, 10 Drawing Sheets

AUTOMATICALLY MAINTAINING METADATA IN A FILE BACKUP SYSTEM

BACKGROUND

Computing devices usually allow users to alter files, such as image, video, and audio files, by allowing users to edit image/video/audio files. For example, while editing an image, a user is often allowed to provide inputs to control an image's color vividness, brightness, contrast, and/or other types of editing parameters. In addition, traditionally users are able to label, flag, and/or caption images/videos during editing.

Unfortunately, it may take several iterations of editing in order for the user to be satisfied with the appearance, or quality of the image/video/audio. This generally results in either having to save changes over the original image/video, or having to save multiple versions of the image/video. However, the problem presented by the example of saving changes over the original image/video file is that it may be difficult to get back to the original image/video if the user later decides that he/she does not like the changes/edits that have been made.

On the other hand, the scenario of saving multiple version of the image/video/audio may quickly become confusing and problematic with numerous saved edited versions of the original image/video. Furthermore, the problem may be exacerbated if there is more than one original image/video/audio to work with and if there is more than one user accessing the same images and/or videos.

SUMMARY

A technology for automatically saving an original copy of an image file in a location hidden from a user is disclosed. The technology accesses metadata associated with an image file and determines whether an original copy of the image file exists. Provided an original copy of the image file exists, an edited version of the image file along with an identifier is saved. If an original copy of the image file does not exist, an original copy of the image file is created, the original copy of the image file is stored, and an edited version of the image file along with an identifier is saved.

BRIEF DESCRIPTION OF THE DRAWINGS

The accompanying drawings, which are incorporated in and form a part of this specification, illustrate embodiments of the present claimed subject matter and, together with the description, serve to explain the principles of the claimed subject matter:

DETAILED DESCRIPTION

Figure 1:
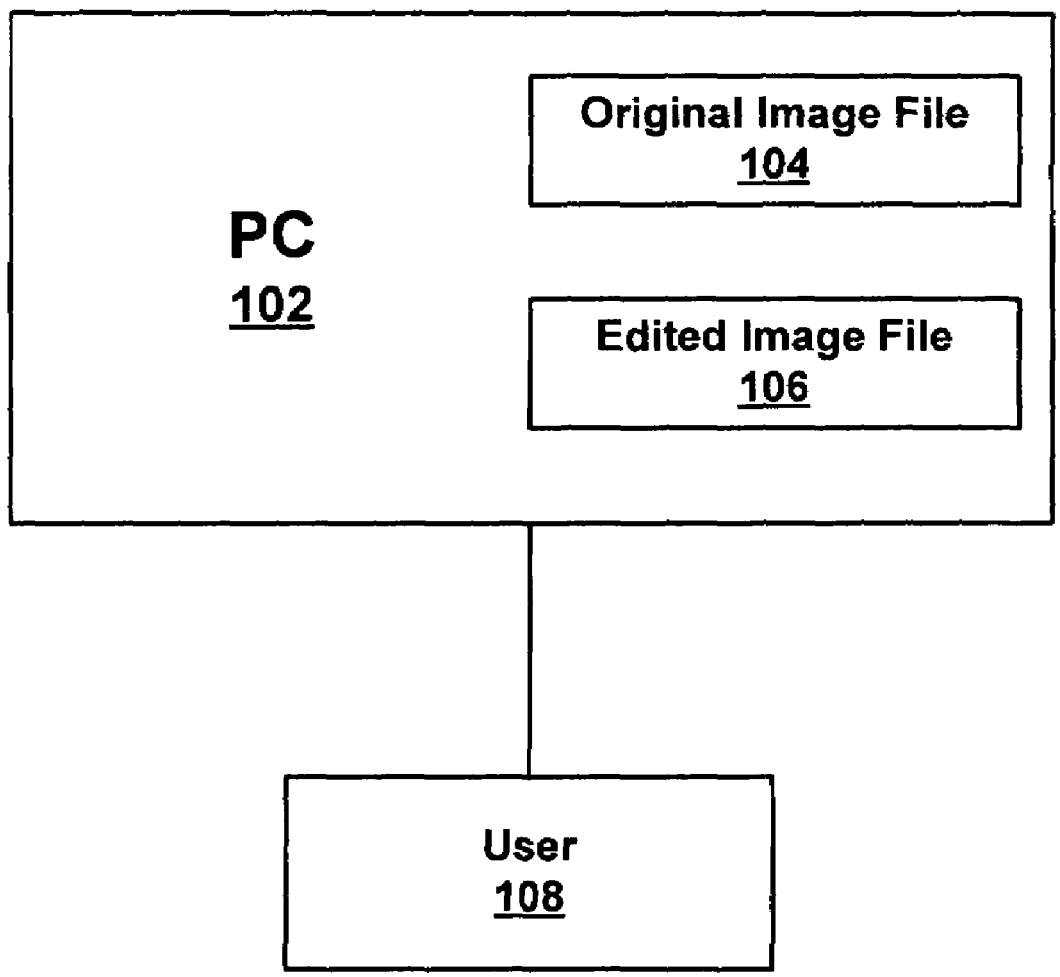
FIG. 1 is a block diagram illustrating an exemplary system of automatically saving an original copy of an image file on a per user basis on a computing device, in accordance with an embodiment of the present claimed subject matter.

Reference will now be made in detail to the preferred embodiments of the present claimed subject matter, examples of which are illustrated in the accompanying drawings. While the claimed subject matter will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present claimed subject matter, numerous specific details are set forth in order to provide a thorough understanding of the present claimed subject matter. However, it will be obvious to one of ordinary skill in the art that the present claimed subject matter may be practiced without these specific details. In other instances, well known methods, procedures, components, and circuits have not been described in detail as not to unnecessarily obscure aspects of the present claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

In overview, embodiments of the present claimed subject matter provide methods and systems for automatically saving an original copy of an image file and/or a video file in a location hidden from a user. More specifically, the embodiments of the present claimed subject matter allow the user to make various edits to an image file and/or a video file without having to worry about saving a copy of the pre-edited image/video file (also referred to as a pre-edited file, or an original copy of an image/video file) since a copy of the pre-edited image/video file is automatically saved in a location hidden from the user upon saving an edit. In one embodiment, the method of restoring a pre-edited file allows the newly restored file to retain metadata that has been added by the user to edited versions since the original copy of the file was created. Moreover, embodiments of the present claimed subject matter may be configured to automatically delete the pre-edited file based on a user-defined specification. For example, in one embodiment, the system may be configured to not keep a pre-edited file over five months.

In addition, the method or system for automatically saving an original copy of an image file and/or a video file may be implemented in various ways, including, but not limited to, saving an original copy of an image file on a computing device, saving an original copy of an image file on a computing device on a per user basis, or saving an original copy of an image file on a network on a per user basis. Saving an original copy of a file on a computing device on a per user basis means that each user has access to an individualized set of files. For example, in the context of a single computing device (e.g., FIG. 1) it may be determined that there is an original copy of an image file for one user, while it may be determined that there is not an original copy of that same image file for another user. In another example, still in the same context of a single computing device and a per user basis, there may be 2 original copies of a video for two individual users on a computing device, but it may be determined that there is not an original copy of the same video for a third user. In addition, this example can be readily extended to the context of a network of computers.

In some instances, embodiments of the present claimed subject matter also includes reverting an edited image (also referred to as an edited version of an image) to an original copy of an image, or reverting an edited video (also referred to as an edited version of a video) to an original copy of a video. If desired, metadata deltas (also referred to as metadata) and file name associated with the edited image/video may be retained to a reverted image/video (also referred to as a reverted version of an image/video). For example, a caption added during an edit may be retained in the reverted image file even if the edited image is reverted to the original image.

In other instances, embodiments of the present claimed subject matter further includes creating a duplicate of an edited image/video file (or edited image/video), while reverting the edited image/video file from which the duplicate was created, so that a reverted file and a duplicated edited file results. In one example, the distinction between a duplicated edited file and a reverted file exists because the duplicated edited file is a file that contains the edited image and the metadata associated with the edited image file, while the reverted file is a file that contains an original image and metadata associated with the edited image file.

Further, in the present claimed subject matter, the term image file refers to a file containing an image, while the term image, when used without the term "file," refers to the actual image within a file. Similarly, the term video file refers to a file containing that video, while the term video, when used without the term "file," refers to the actual video within a file. To illustrate, in the context in which a user desires to work with both an edited image file containing the latest edited image and its associated metadata and a reverted image file containing the original image and metadata associated with the latest edited file, an edited image file may be duplicated to form a duplicated edited file, while only an edited image itself is reverted back into an original image so that the latest metadata remains and is not reverted.

FIG. 1 is a block diagram illustrating an exemplary system 100 of automatically saving an original copy of an image file on a per user basis on a computing device, in accordance with an embodiment of the present claimed subject matter. As depicted in FIG. 1, the exemplary system 100 includes a user 108, and a computing device 102 (illustrated as PC 102). As depicted, the computing device 102 includes an original image file 104 and an edited image file 106. Although system 100 is shown and described as having certain numbers and types of elements, the present embodiment is not so limited; that is, system 100 may include elements other than the shown, and may also include more than one of the elements that are shown.

Still referring to system 100 of FIG. 1, the user 108 may be, but is not limited to, an end user, individual user device, or a computer program. There may also be more than one user. The computing device 102 may be, but is not limited to, a desktop computer, a notebook computer, or a personal digital assistant (PDA).

In reference to FIG. 1, the present embodiment is described in the context of an example in which automatically saving an original copy of an image file is performed on a per user basis on a computing device. The present embodiment is further described in context of an example in which only one edited image file is saved. However, this example can be readily extended to other situations and embodiments. For example, there may be a multiple number of edited image files saved by the user 108. In another example, there may be more than one user with access to personal computer 102. As depicted by FIG. 1, computing device 102 is a personal computer which automatically saves an original copy of an image file (e.g., original image file 104) upon saving an edited image file (e.g., edited image file 106) created by the user 108.

Figure 2:
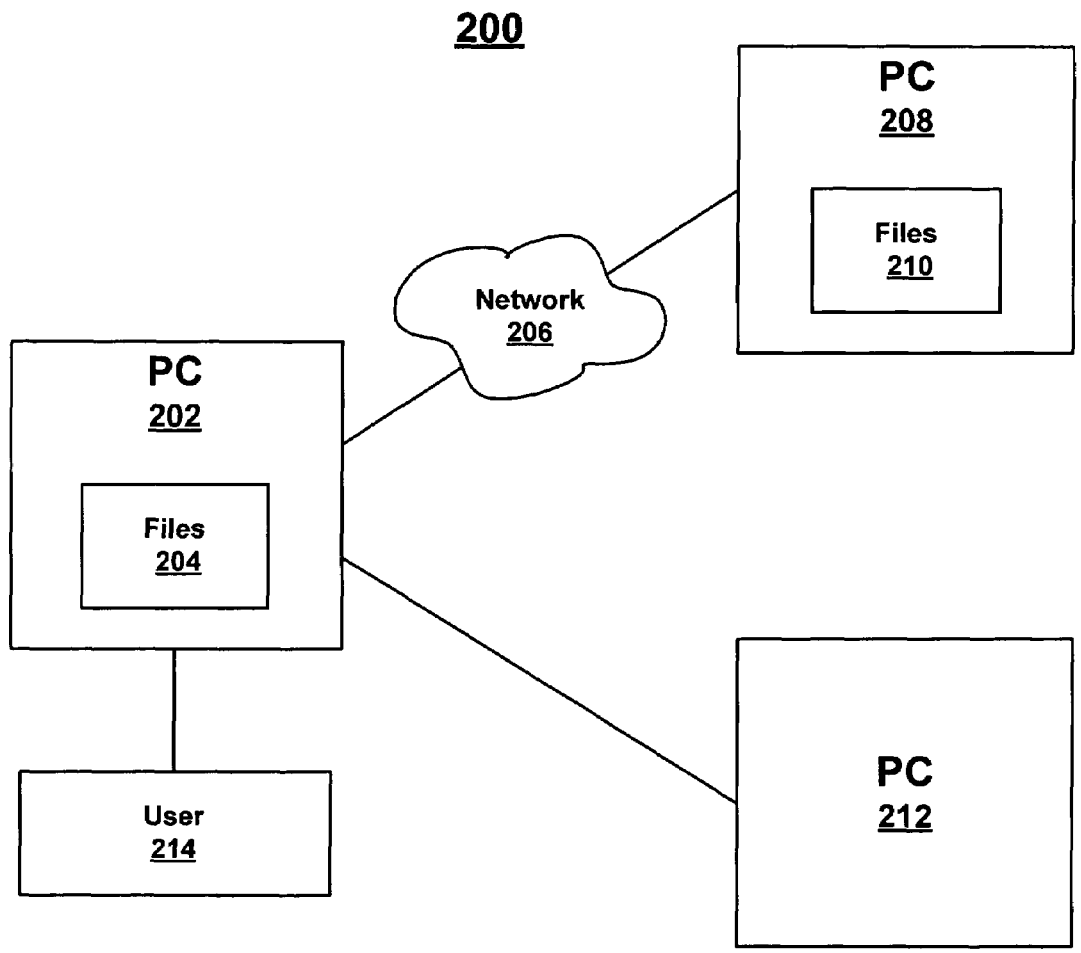
FIG. 2 is a block diagram illustrating an exemplary system of automatically saving an original copy of an image file on a per user basis across a network, in accordance with an embodiment of the present claimed subject matter.

FIG. 2 is a block diagram illustrating an exemplary system 200 of automatically saving an original copy of an image file on a per user basis across a network, in accordance with an embodiment of the present claimed subject matter. As depicted in FIG. 2, system 200 includes a user 214 connected to a computing device 202 (PC 202), which is further connected to a computing device 212 (PC 212). PC 202 is also and connected to a computing device 208 (PC 208) via a network 206. As depicted, PC 202 includes files 204 and PC 208 includes files 210. Although system 200 is shown and described as having certain numbers and types of elements, the present embodiment is not so limited; that is, system 200 may include elements other than those shown, and may include more than one of the elements that are shown.

As depicted by system 200 of FIG. 2, network 206 is the data communication system that interconnects devices. A network can be implemented in a wide variety of ways. For example, network 206 can be implemented as, but is not limited to, a local area network (LAN), a Metropolitan area network (MAN), a wide area network (WAN), a storage area network, and/or the Internet. In one embodiment, network 206 is a wireless network. The user 214 may be, but is not limited to, an end user, individual user device, or a computer program. There may also be more than one user. Each of the computing devices 202, 208, and 212 may be, but is not limited to, a desktop computer, a notebook computer, or a PDA. Files 204 and 210 are exemplary image and/or video files that are accessed by the user 212.

Still in reference to FIG. 2, the present embodiment is described in the context of an example in which the method of automatically saving an original copy of an image file is performed on a per user basis across a network. In one embodiment, saving an original copy of an image file on a per user basis across a network means that for each specific user, means that for that network there is a file access specific to that particular user. For example, as depicted in FIG. 2, in one embodiment, a user 212 may access both image files 204 of PC 202 and image files 210 of PC 208 for editing. In another example, the user 214 may access and edit image files of only one computing device (e.g., PC 212). In yet another example, a user may edit an image file on PC 202, while editing two video files on another computing device (e.g., PC 208).

Figure 3:
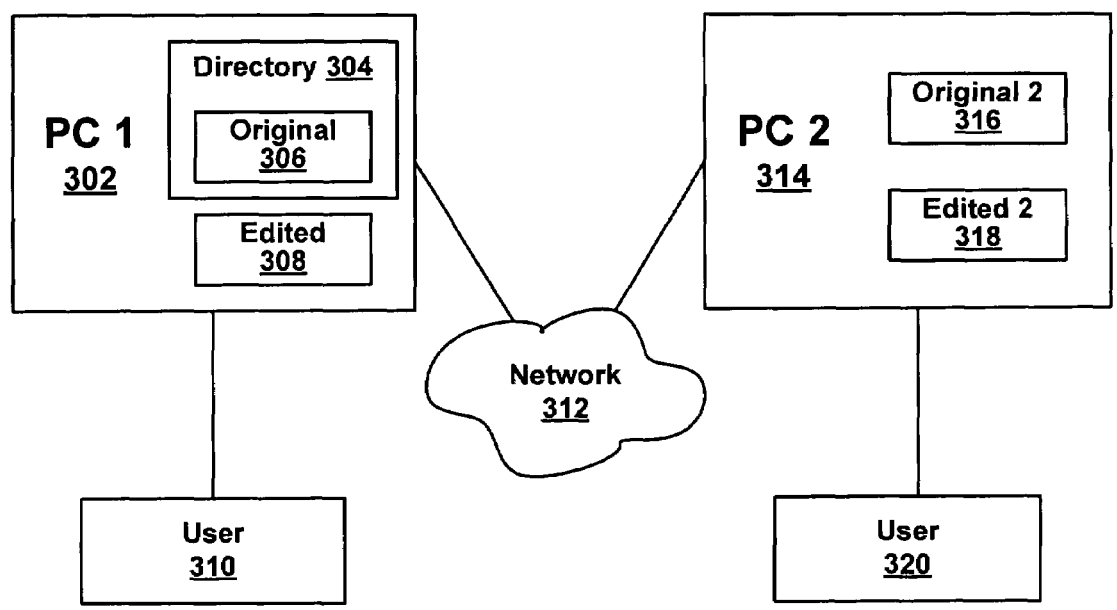
FIG. 3 is a block diagram illustrating an exemplary system of automatically saving an original copy of an image file on a per computing device basis across a network, in accordance with an embodiment of the present claimed subject matter.

Referring now to FIG. 3, a block diagram of an exemplary system 300 of automatically saving an original copy of an image file on a per computing device basis across a network is illustrated, in accordance with an embodiment of the present claimed subject matter. As depicted in FIG. 3, system 300 includes two users (310 and 320, respectively) connected to computing devices 302 and 314, respectively (PC 1 and PC 2, respectively). In turn, in the embodiment depicted, PC 1 and PC 2 are connected via network 312. As depicted, PC 1 includes edited file 308, directory 304, and an original copy of a file (e.g., original 306). PC 2 includes an edited file 318 (e.g., edited 318) and an original copy of a file 316 (e.g., original 2). Although system 300 is shown and described as having certain numbers and types of elements, the present embodiment is not so limited; that is, system 300 may include elements other than those shown, and may include more than one of the elements that are shown.

In one embodiment, an original copy of a file (original 306) is contained within a directory (e.g., directory 304). In this embodiment, original 306 is an original copy of an image or video file stored within the directory 304. A directory can be a directory in which all original copies of files (whether image or video) may be stored (such a directory may be hereinafter referred to as an original directory). In addition, there could be more than one original directory on a computing device for different users. This means a directory may also be user specific. For example, on one computing device there could be three original directories for use by three different users. Furthermore a directory may be accessed by a user across a network.

Referring back to FIG. 3, as depicted, in one embodiment, user 310 is able to access an edited image/video file 308, which corresponds to an associated original copy of an image/video file stored within original directory 304. The user 320 is able to access an edited image/video file 318 (e.g., edited 2), which corresponds to an associated original copy of an image/video file 316 (e.g., original 2). In another embodiment, still in the context in which the automatic saving of an original copy of an image file is performed on a per computing device basis across the network, there may be more than one user that is able to access an edited file on a computing device. For example, in addition to user 310, there may be another user that is able to access edited image/video file 308 and its corresponding associated original copy of an image/video file stored within original directory 304. In one example, by allowing more than one user to access the same files stored within a directory, the ability of a user to quickly pick up where the last user left off may be enhanced.

Figure 4:
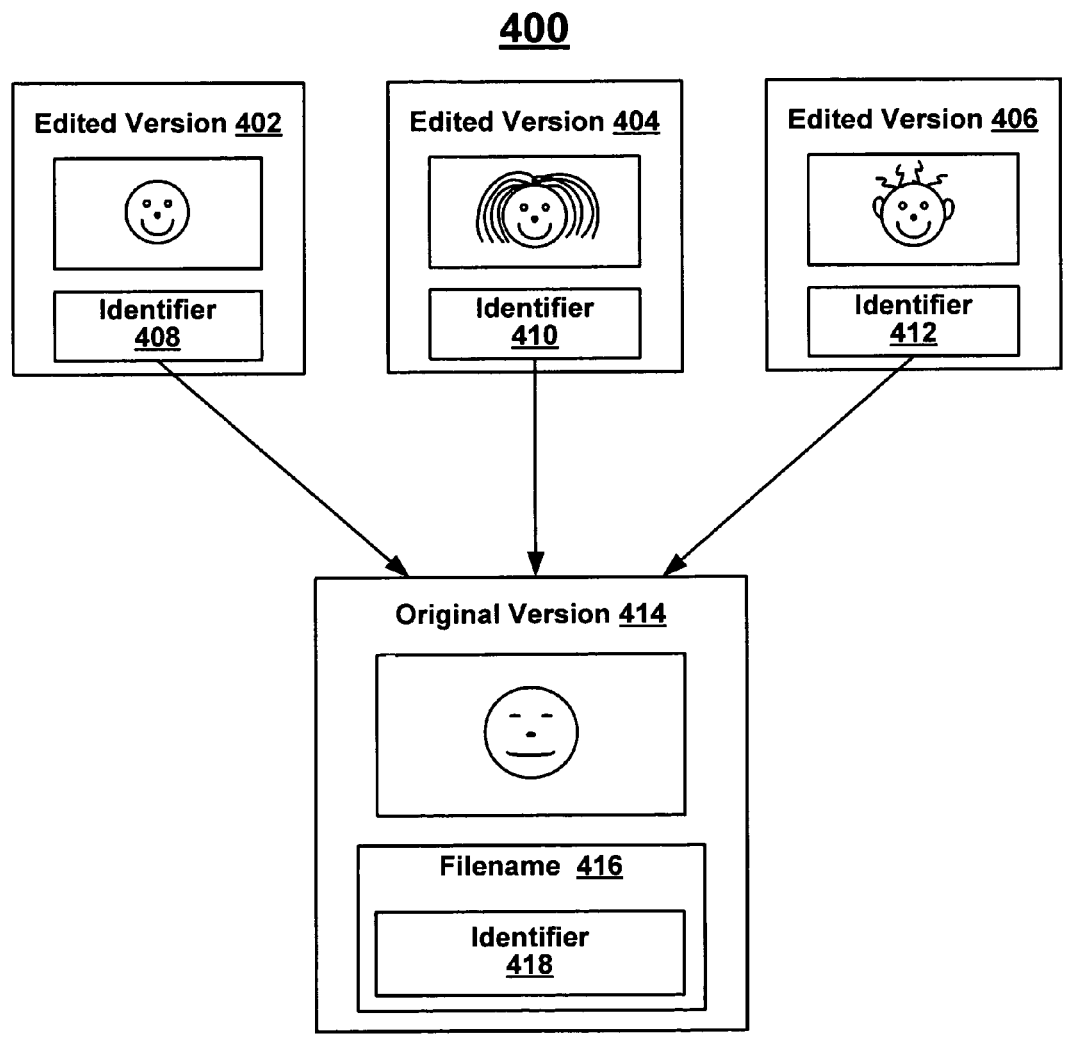
FIG. 4 is a block diagram illustrating a plurality of edited versions of an image file with identifiers which point to an original copy of the image file, in accordance with an embodiment of the present claimed subject matter.

FIG. 4 is a block diagram illustrating a plurality of edited versions of an image file with identifiers which point to an original copy of the image file, in accordance with an embodiment of the present claimed subject matter. As depicted in FIG. 4, a plurality of edited versions of an image file (edited version 402, edited version 404, and edited version 406) all contain identifiers (identifier 408, identifier 410, and identifier 412, respectively) as part of their file. An identifier of an edited version of a file points to an original copy of that file (e.g., original version 414). In one embodiment, original version 414 has a file name 416 which includes identifier 418. Furthermore, in one embodiment, original version 414 is an original copy of the image from which the edited versions (edited versions 402, 404, and 406) are derived. In one embodiment, the identifiers 408, 410 and 412 are associated with the identifier 418, and thus allow edited version 402, 404, and 406, respectively, to point to the original version 414. Also, although system 400 is shown and described as having certain numbers and types of elements, the present embodiment is not so limited; that is, system 400 may include elements other than those shown, and may include more than one of the elements that are shown.

Figure 5:
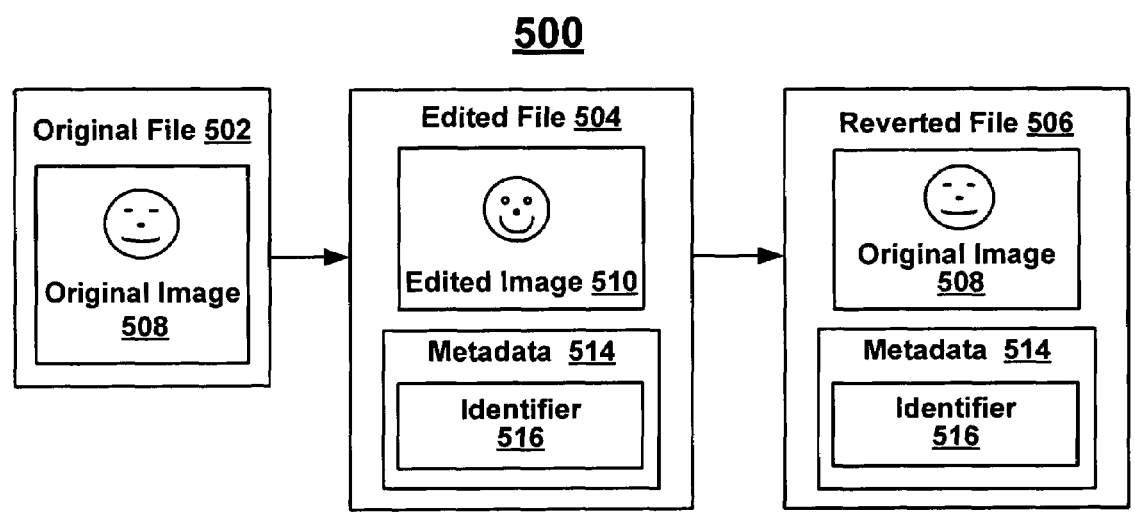
FIG. 5 illustrates an exemplary edited version of an image being reverted to an original copy of an image, in accordance with an embodiment of the present claimed subject matter.

In reference to FIG. 5, an embodiment of exemplary image files during different stages of a revert process is depicted, in accordance with an embodiment of the present claimed subject matter. In one embodiment, an original copy of a file (depicted as original file 502) is edited, resulting in an edited version of an image file (depicted as edited file 504). Furthermore, the edited version of an image (depicted as edited image 510) of edited file 504 is reverted to an original copy of an image (e.g., original image 508) while the metadata (metadata 514, also referred to as metadata deltas) associated with the edited file 504 is kept in the resulting reverted file 506. As depicted in FIG. 5, metadata 514 includes an identifier 516, which is associated with an original copy of that file. In another embodiment, metadata associated with an edited file may include, but is not limited to, labels, captions, and flags added by a user during an edit.

Referring back now to FIG. 5, in one embodiment, when the edited file 504 is reverted, the resulting reverted file 506 contains the original image 508 and metadata 514, which contains identifier 516. However, a reverted file does not have to include metadata from previous edits. For example, in another embodiment, the reverted file may not retain metadata from the edited file. In yet another embodiment, it may be a video file that is reverted, resulting in either a reverted video file with metadata from the last edit, or a reverted video file without metadata from the last edit. Although system 500 is shown and described as having certain numbers and types of elements, the present embodiment is not so limited; that is, system 500 may include elements other than those shown, and may include more than one of the elements that are shown.

Figure 6:
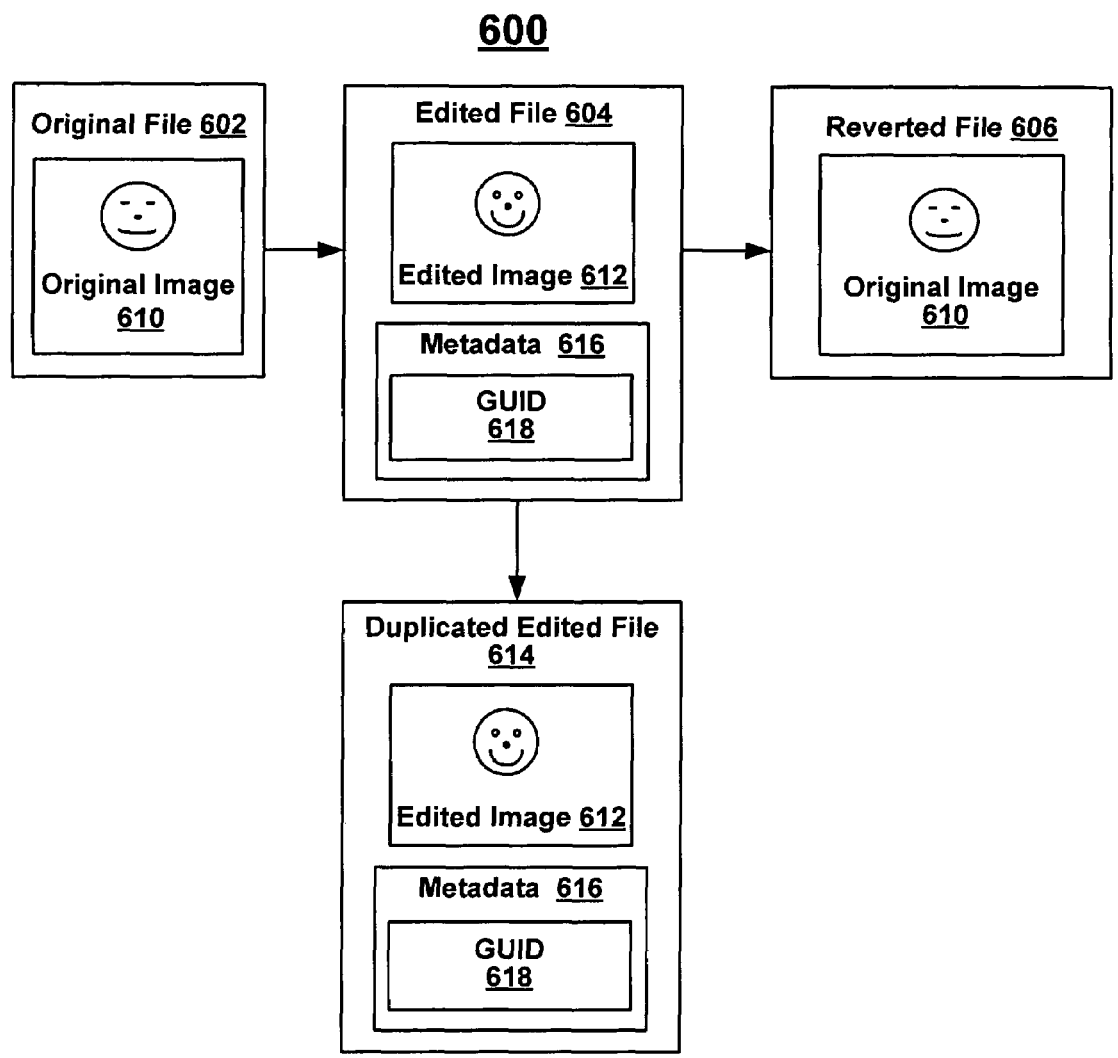
FIG. 6 illustrates creating a duplicated edited image file and creating a reverted file, in accordance with an embodiment of the present claimed subject matter.

FIG. 6 depicts exemplary image files during different stages of a duplication process and a revert process, in accordance with an embodiment of the present claimed subject matter. As depicted, in one embodiment, original file 602 with original image 610 is edited, resulting in an edited file 604 with an edited image 612 and metadata 616 containing a globally unique identifier (e.g., GUID 618). As depicted by FIG. 6, in one embodiment, the edited file 604 is then duplicated to form a separate duplicated edited file 614, which is a copy of the edited file 604. In one embodiment, the duplicated edited file 614 is saved, while the edited image 612 of the edited file 604 is reverted to the original image. In one embodiment, the revert results in a reverted file 608 containing an original image 610. In another embodiment, it may be the original edited file 604 that is saved, while the edited image 612 of the duplicated edited file is reverted to an original image 610. In yet another embodiment, the reverted file 608 may retain the metadata (e.g., metadata 616) from edits performed prior to reverting. Although system 600 is shown and described as having certain numbers and types of elements, the present embodiment is not so limited; that is, system 600 may include elements other than those shown, and may include more than one of the elements that are shown.

FIG. 7 is explained in the context in which a user has an edited version of an image file ready to be saved. As depicted, FIG. 7 is a flowchart illustrating an exemplary method 700 of automatically saving an original copy of an image file, in accordance with an embodiment of the present claimed subject matter. Method 700 may be implemented in various ways. For example, in one embodiment, method 700 is implemented on a single computing device, while in another embodiment; method 700 is implemented on a network. In yet another embodiment, the files of method 700 are audio files. Also, although specific steps are disclosed in flowchart 700, such steps are exemplary. That is, various embodiments are well suited to performing a variety of other additional steps or variations of the steps recited in flowchart 700. The steps in flowchart 700 may also be performed in an order different than presented. At block 702, the process starts.

At block 704, in one embodiment, metadata associated with an image file is accessed. Metadata associated with an image file may include a variety of information, such as, but not limited to, flags, captions, identifier information, and labels. Also, in another embodiment, metadata that is accessed may be associated with a file that is a video file. For example, in one embodiment, a plurality of files are accessed on one computing device, while in another embodiment, a plurality of files are accessed on various computing devices.

Referring back now to FIG. 7, at block 706, whether an original copy of the image file exists is determined. Determination of whether an original copy of the image file exists may be implemented in variety of ways. For example, in one embodiment, the determination may be implemented on a computer, while in another embodiment; the determination may be implemented over a network. In yet another embodiment, the determination may be implemented on a per user basis whether on a single computing device, or across a network. For example, in the context of a single computing device (e.g., FIG. 1) it may be determined that there is an original copy of an image file for one user, while it may be determined that there is not an original copy of that same image file for another user. In addition, this example can be readily extended to the context of a network of computers.

At block 708 of FIG. 7, in one embodiment, if it is determined that there is an original copy of the image file, then an edited version of that image file is saved along with an identifier associated with the original copy of the image file. In a network context, an edited version of an image file may be saved on one or more computing devices that is not the computing device on which the last edit was performed.

Figure 7A:
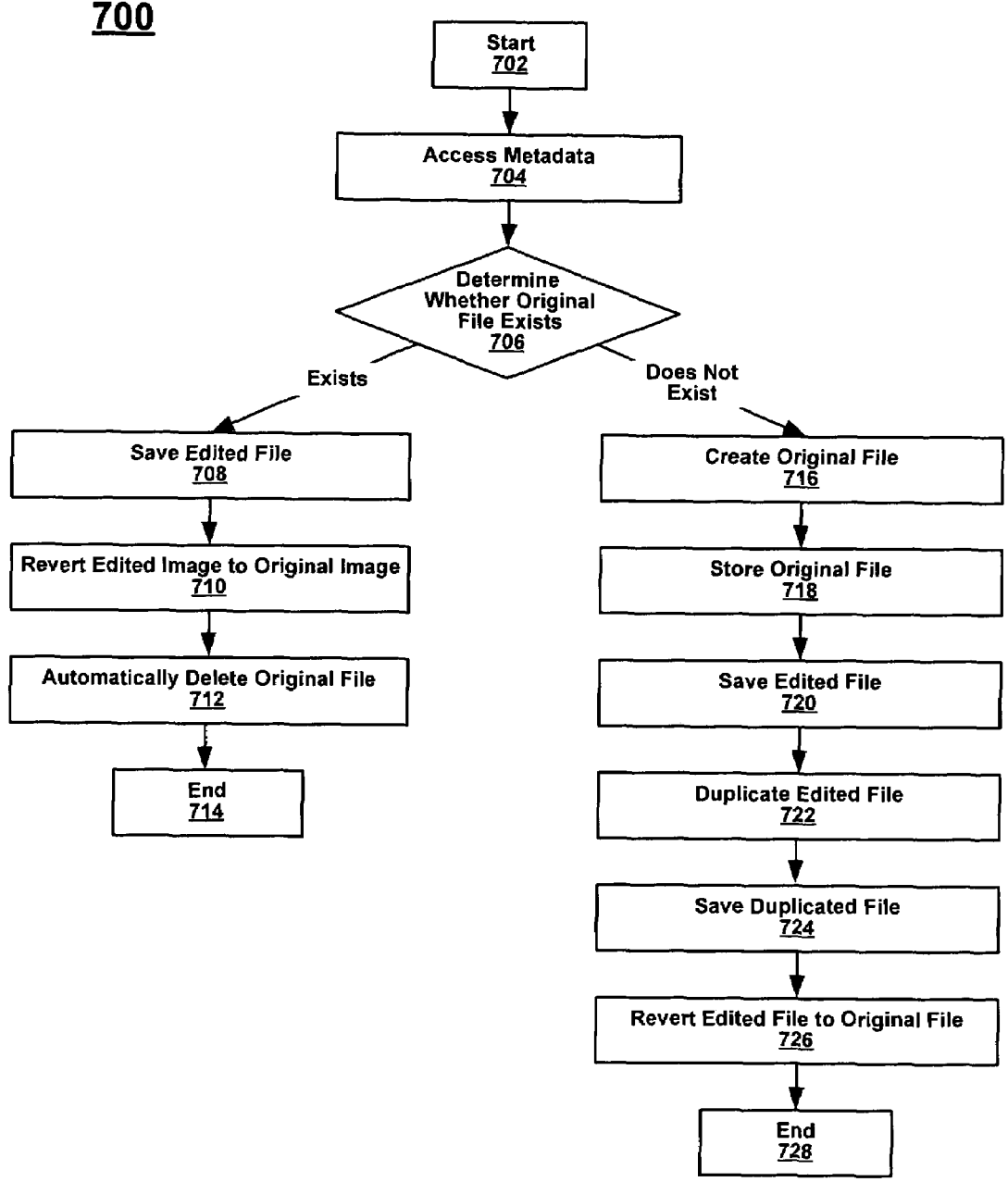
FIG. 7A is a flowchart illustrating an exemplary method of automatically saving an original copy of an image file, in accordance with an embodiment of the present claimed subject matter.
Figure 7B:
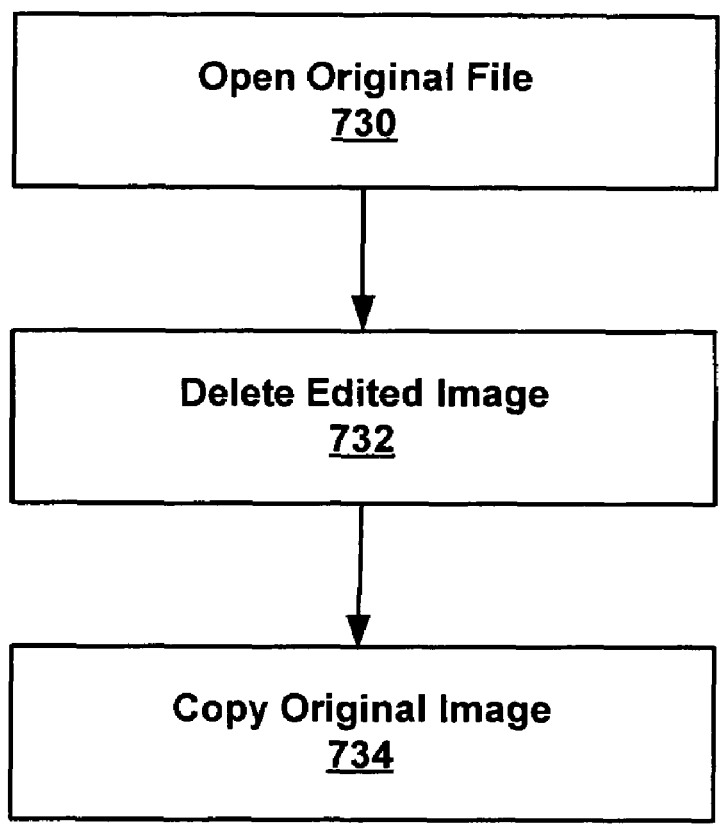
FIG. 7B is a flowchart illustrating an exemplary method of reverting an edited image to an original image as depicted a block of FIG. 7, in accordance with an embodiment of the present claimed subject matter.

At block 710, in one embodiment, the edited image of the edited image file is reverted back to an original image (see FIG. 7B for a breakdown of an exemplary revert process). In another embodiment, in which the files of FIG. 7 refer to video files, it is an edited video and its accompanying metadata that is reverted to an original copy of that video without accompanying metadata. In yet another embodiment in which no additional process is chosen, the process ends at block 710.

At block 712, in one embodiment, the original copy of the image file is automatically deleted. An original copy of an image file may be preconfigured to be automatically deleted based on a user defined specification. A user defined specification may include, but is not limited to, the age of an original copy of an image file. For example, in one embodiment, an original copy of an image file may be preconfigured to be automatically deleted once 3 months has passed since the original copy of the image file was first saved along with an edited version of the image file. In addition, in another embodiment, a user defined specification may include various preconfigured settings for management of the original copy of an image file. For example, in one embodiment, such preconfigured settings may include allowing the user to select between preserving originals indefinitely, preserving original for a certain number of days chosen by the user, or to not keep originals.

At block 714, the process ends for an example of an embodiment in which an original copy of the image file is determined to exist in block 706. However, for an example of an embodiment in which an original copy of the image file is determined not to exist in block 706, in one embodiment, the process continues from block 706 to block 718, where an original copy of the image file is created. An original copy of a file may be a duplicate of the original file with no alteration in the file, or in the metadata of the file, except for the file name of the original copy of the file. A file name of an original copy of a file may include identifier information to link the original copy of a file to its associated edited version of a file. In one embodiment, identifier information within the file name of an original copy of a file may be a globally unique identifier.

At block 718, in one embodiment, the original copy of the image file is stored in a location hidden from a user. An original copy of an image file may be stored in a directory. In one embodiment, a location hidden from a user may be in an originals directory. An original directory that is user specific may be a directory in which all original copies of files for a specific user may be stored. An original directory that is computer device specific may be a directory which all original copies of files for a computer device may be stored. In addition, in one embodiment, an original directory is located under AppData. There may be only one path per user as to where original copies of files are stored and restored. Furthermore, in one embodiment, a directory is not be indexed by a library so as to be hidden.

At block 720, in one embodiment, an edited version of the image file, including an identifier associated with the original copy of the image file so that the edited version and the original copy of the image file may be linked, is saved. In a network context, edited files may be stored in various supporting computing devices, while an original copy of the file may be created on the local computing device. For example, in one embodiment, in the context of a network including a personal computer 1, 2 and 3, in which a user is working on personal computer 1 and is connected via personal computer 1 to personal computer 2 and 3 (assuming both personal computers 2 and 3 do not have an original copy of the image file), the edited version of the image may be stored on computing device 2 and/or 3, while the original copy of the image file may be stored on personal computer 1.

Referring now back to FIG. 7, at block 722, in one embodiment, the edited version of the image file is duplicated. The duplicated edited version of the image file (also referred to as duplicate edited file) includes the same identifier information as the edited version of the image file as to allow the duplicate edited file and the original copy of the image file to be linked. In another embodiment, a duplicate edited file is not desired and thus the process ends.

Referring back now to FIG. 7A, at block 724, in one embodiment, the duplicated file (duplicate edited file) is saved.

At block 726, in one embodiment, the edited version of the image file is reverted to an original copy of the image file. Reverting an edited version of a file may include an reverted image or a video with or without metadata from previous edits. For example, in one embodiment, reverting the edited version of the image file results in a reverted image file in which the reverted image file includes the original image and the metadata information from previous edits; while in another embodiment, reverting the edited version of the image file results in a reverted image file in which the image is reverted, but metadata information from previous edits are not kept.

At block 728, in one embodiment, the process ends.

In reference now to FIG. 7B, still in the same context as FIG. 7A, FIG. 7B is an exemplary flowchart further illustrating the method 710 of reverting an edited image to an original image as depicted in block 710 of FIG. 7A. At block 730, in one embodiment, an original copy of an image file is opened.

Still referring to FIG. 7B, at block 732, the edited image of the edited version of the image file is deleted, while the metadata information is left intact, in accordance with an embodiment of the present claimed subject matter. Metadata information left intact may include captions, flags, and/or labels. In another embodiment in which the referred to file is a video file, it is the edited video of the edited version of the video file that is deleted.

In reference back to FIG. 7B, at block 734, in one embodiment, the original image from the original copy of the image file is copied into the location in which the edited version of the image was located. In an embodiment, in which the referred to file is a video file, it is the original video of the original copy of the video file that is copied into the location in which the edited version of the video was located. Although specific steps are disclosed in flowchart 710, such steps are exemplary. That is, various embodiments are well suited to performing a variety of other additional steps or variations of the steps recited in flowchart 710. The steps in flowchart 710 may also be performed in an order different than presented.

Figure 8:
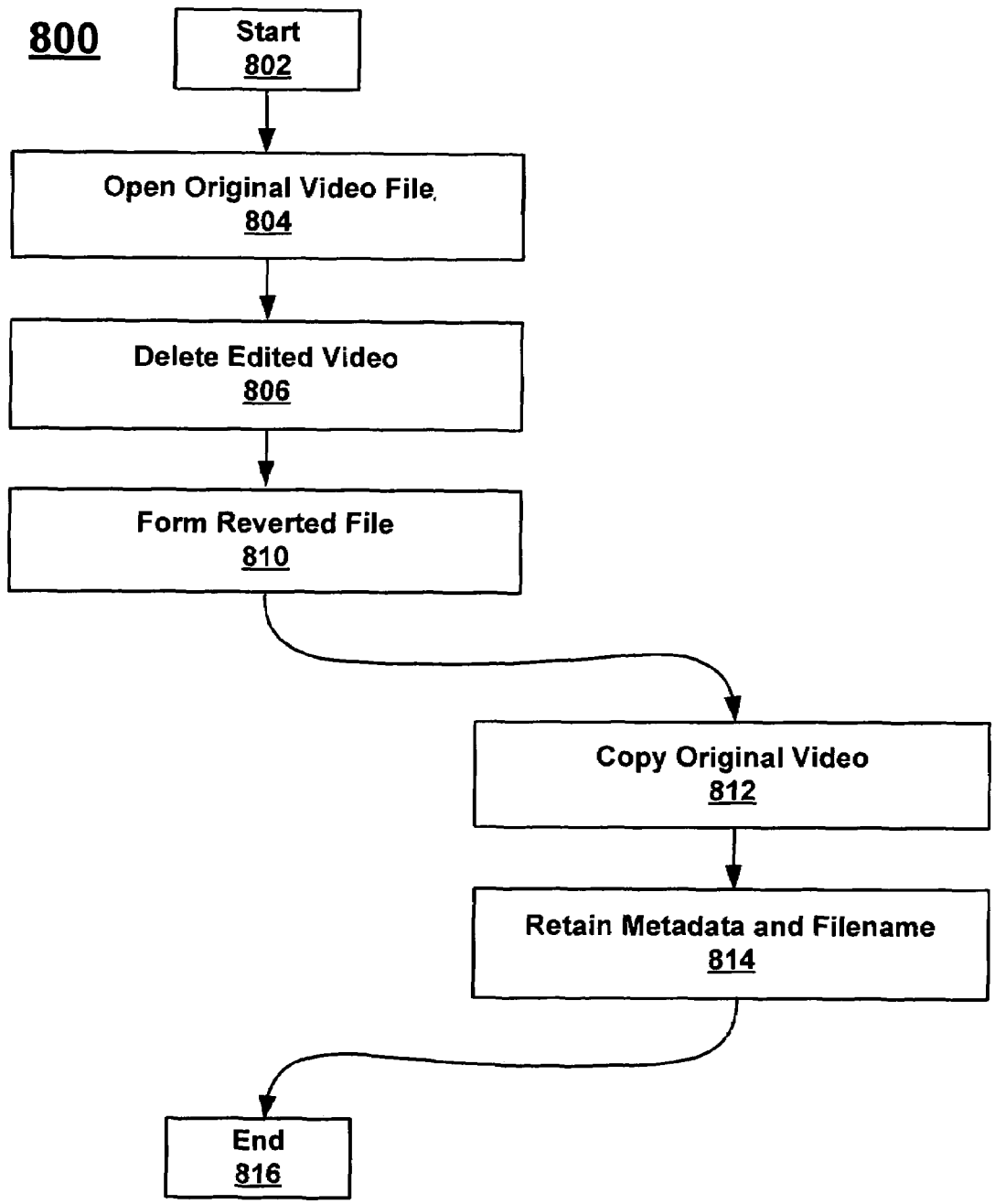
FIG. 8 it flowchart illustrating an exemplary method of reverting an edited version of a video to an original copy of a video, in accordance with an embodiment of the present claimed subject matter.

Referring now to the context in which the method 700 of automatically saving an original copy of a file is applied to a video file, FIG. 8 is a flowchart illustrating a method 800 of reverting an edited version of a video to an original copy of a video. At block 802, in one embodiment, the process starts. Assuming files of method 700 are video files, the method 800 may take place after all or part of method 700 has taken place, or the method 800 may replace certain blocks of the method 700. For example, in one embodiment, an original copy of a video file is stored (see block 718 of FIG. 7A) and an edited version of the video file is stored (see block 720 of FIG. 7A) prior to the process 800 of FIG. 8 taking place. The method 800 may also take place independent of method 700. Although specific steps are disclosed in flowchart 800, such steps are exemplary. That is, various embodiments are well suited to performing a variety of other additional steps or variations of the steps recited in flowchart 800. The steps in flowchart 800 may also be performed in an order different than presented.

Still referring to FIG. 8, at block 804, in one embodiment, an original copy of a video file associated with an edited version of the video file is opened. In another embodiment, in the context of an image file, an original copy of an image file associated with an edited version of an image file is opened.

At block 806, in one embodiment, the edited version of the video is deleted without deleting a metadata delta and the file name associated with the edited version of the video file. In another embodiment, in the context of an image file, the edited version of an image is deleted without deleting a metadata delta and the file name associated with the edited version of the image file.

At block 810, in one embodiment, a reverted video file is formed. A reverted video file may be formed in several ways. For example, in one embodiment (depicted by block 812 and 814), the reverted video file is formed by copying, or overwriting, the original copy of the video into a location in which the edited version of the video was located. Still in this present exemplary embodiment, the metadata delta and file name associated with the edited version of the video file are retained in the reverted file.

At block 816, the process ends. However, in another embodiment in which further processes are desired, the process does not end here. Instead, the process may continue and contain other processes, such as, but not limited to duplicating an edited version of the video file and/or automatically deleting the original copy of the file upon the meeting of a certain criteria, or age.

Figure 9:
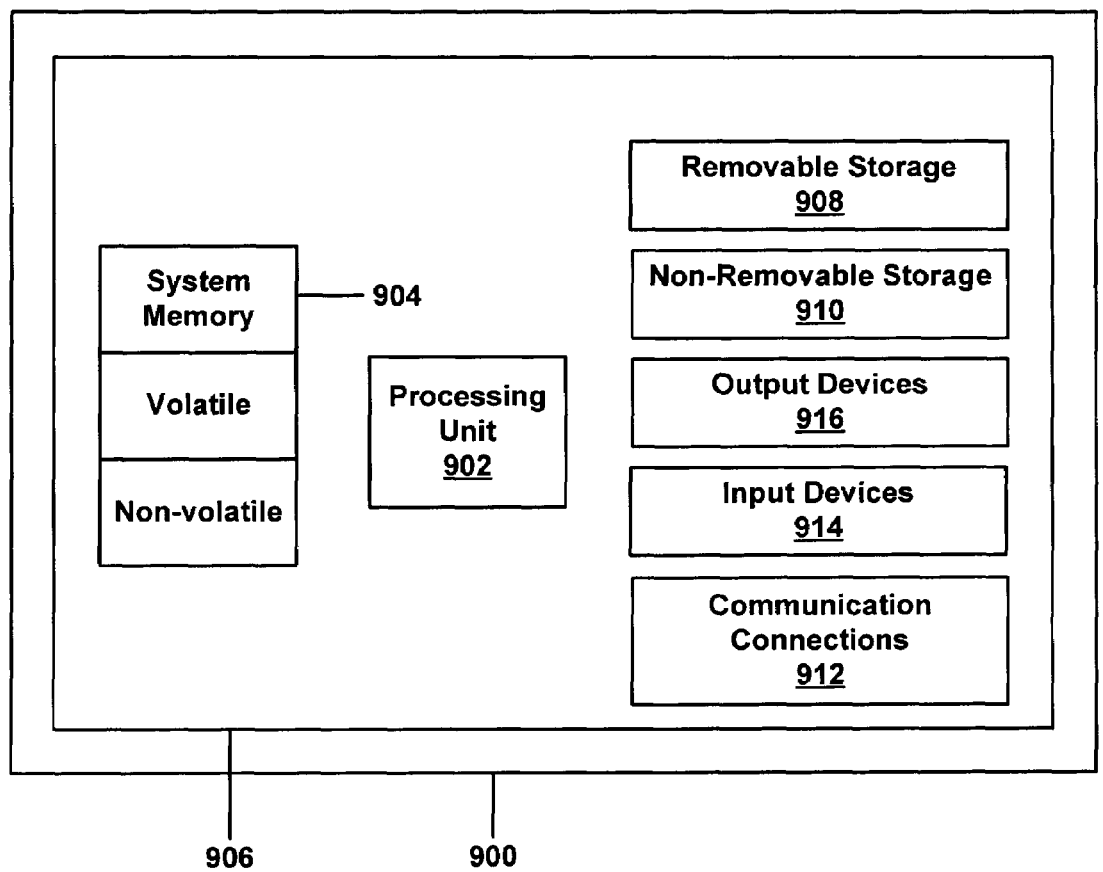
FIG. 9 illustrates an exemplary system for implementing the claimed subject matter, in accordance with an embodiment of the present claimed subject matter.

Referring now to FIG. 9, in the context of an exemplary operating environment, FIG. 9 illustrates an exemplary system for implementing the claimed subject matter, in accordance with an embodiment of the present claimed subject matter. With reference to FIG. 9, an exemplary system for implementing the claimed subject matter includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media. The term computer readable media as used herein includes both storage media and communication media.

Device 900 may also have input device(s) 914 such as keyboard, mouse, pen, voice input device, touch input device, etc. Output device(s) 916 such as a display, speakers, printer, etc. may also be included. All these devices are well known in the art and need not be discussed at length here.

In the foregoing specification, embodiments have been described with reference to numerous specific details that may vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically saving an original copy of an image file, said method comprising:
   accessing metadata associated with said image file;
   determining whether an original copy of said image file exists;
   if said original copy of said image file exists, saving an edited version of said image file, wherein said edited version of said image file comprises an identifier, and wherein said identifier is used to associate said edited version of said image file with said original copy of said image file; and
   if said original copy of said image file does not exist:
      creating said original copy of said image file;
      storing said original copy of said image file, wherein said original copy of said image file is stored in a location hidden from a user; and
      saving said edited version of said image file, wherein said edited version of said image file comprises said identifier.

2. The method as recited in claim 1 further comprising reverting an edited version of said image to an original copy of said image, wherein said reverting comprises:
   opening said original copy of said image file associated with said edited version of said image file;
   deleting said edited version of said image; and
   copying said original copy of said image into a location in which said edited version of said image was located.

3. The method as recited in claim 1 further comprising:
   automatically deleting said original copy of said image file based on a user defined specification.

4. The method as recited in claim 1 further comprising:
   creating a duplicate of said edited version of said image file;
   saving said duplicate; and
   reverting said edited version of said image file to said original copy of said image file.

5. The method as recited in claim 1 wherein said determining whether said original copy of said image file exists comprises searching through a directory.

6. The method as recited in claim 1 wherein automatically saving said original copy of said image file is performed on a per computing device basis across a network.

7. The method as recited in claim 1 wherein automatically saving said original copy of said image file is performed on a per user basis on a computing device.

8. The method as recited in claim 1 wherein automatically saving said original copy of said image file is performed on a per user basis across a network.

9. The method as recited in claim 1 wherein a plurality of edited versions of said image file resulting from a plurality of edits comprises identifiers which point to said original copy of said image file.

10. A computer-storage medium having computer-readable program code embodied therein for implementing a method for maintaining an original copy of an image file across an edit, said method comprising:
   reading metadata of an edited version of said image file;
   detecting for an original copy of said image file, wherein said detecting comprises:
      examining said edited version of said image file for the presence of an identifier associated with said original copy of said image file; and
      checking for said original copy of said image file associated with said edited version of said image file; and
   saving said edited version of said image file, wherein said edited version of said image file comprises an identifier, and wherein if said original copy of said image file was not detected, upon saving said edited version of said image file, creating said original copy of said image file in a location hidden to a user.

11. The computer-usable medium as recited in claim 10 further comprising:
   automatically deleting said original copy of said image file based on age.

12. The computer-usable medium as recited in claim 10 wherein said identifier is a globally unique identifier (GUTD).

13. The computer-usable medium as recited in claim 10 wherein said detecting said original copy of said image file comprises searching through a network.

14. The computer-usable medium as recited in claim 10 wherein said original copy of said image file has a file name, and wherein said file name comprises identifier information.

* * * * *